United States Patent [19]

Schoepe et al.

[11] Patent Number: 4,938,245
[45] Date of Patent: Jul. 3, 1990

[54] LOW NOISE TOILET TANK VALVE

[75] Inventors: Adolf Schoepe; Oscar Dufau, both of Fullerton, Calif.

[73] Assignee: Fluidmaster, Inc., Burton, Calif.

[21] Appl. No.: 411,909

[22] Filed: Sep. 25, 1989

[51] Int. Cl.⁵ .................. F16K 47/02; F16K 47/16; F16K 31/24

[52] U.S. Cl. .......................... 137/2; 137/216; 137/426; 137/436; 137/443; 138/45; 181/234; 251/121

[58] Field of Search ............... 137/207, 215, 216, 217, 137/218, 426, 436, 441, 443, 593, 2; 138/30, 45; 181/233, 234; 251/121, 118

[56] References Cited

U.S. PATENT DOCUMENTS

| | | | |
|---|---|---|---|
| 2,111,614 | 3/1938 | Cox | 137/215 |
| 2,212,284 | 8/1940 | Wolff | 137/436 |
| 2,261,948 | 11/1941 | Beach | 181/233 |
| 2,277,878 | 3/1942 | Morris | 137/441 |
| 2,382,500 | 8/1945 | Owens | 137/216 |
| 2,409,890 | 10/1946 | Owens | 137/216 |
| 2,955,672 | 10/1960 | Kass | 181/234 |
| 3,107,747 | 10/1963 | Parkison | 137/441 |
| 3,473,565 | 10/1969 | Blendermann | 138/30 |
| 3,516,094 | 6/1970 | Reagan | 137/436 |
| 3,867,963 | 2/1975 | Ballard | 138/45 |
| 4,108,202 | 8/1978 | Schoepe | 137/436 |
| 4,338,964 | 7/1982 | Schoepe | 137/436 |
| 4,515,536 | 5/1985 | Van Os | 138/45 |
| 4,586,873 | 5/1986 | Lepretre et al. | 251/5 |

Primary Examiner—George L. Walton
Attorney, Agent, or Firm—Freilich, Hornbaker & Rosen

[57] ABSTRACT

A toilet refill valve is described for refilling a water closet after each flushing, which produces minimal noise during the refill process. The valve includes a valve device which can open to pass water to a vertical outlet tube that empties into the bottom of the water closet. An anti-siphon air tube near the top of the outlet tube has an upper end open to the atmosphere and a lower end facing downwardly along the outlet tube. A restriction in the outlet tube below the air tube, causes water to fill the outlet tube and at least the bottom of the air tube for a water inlet pressure of at least 20 psi. The water at the bottom of the air tube prevents air from being dragged into the downwardly facing air tube, to avoid the noise that would result from such air flowing through the air tube and bubbling out of the bottom of the outlet tube.

11 Claims, 3 Drawing Sheets

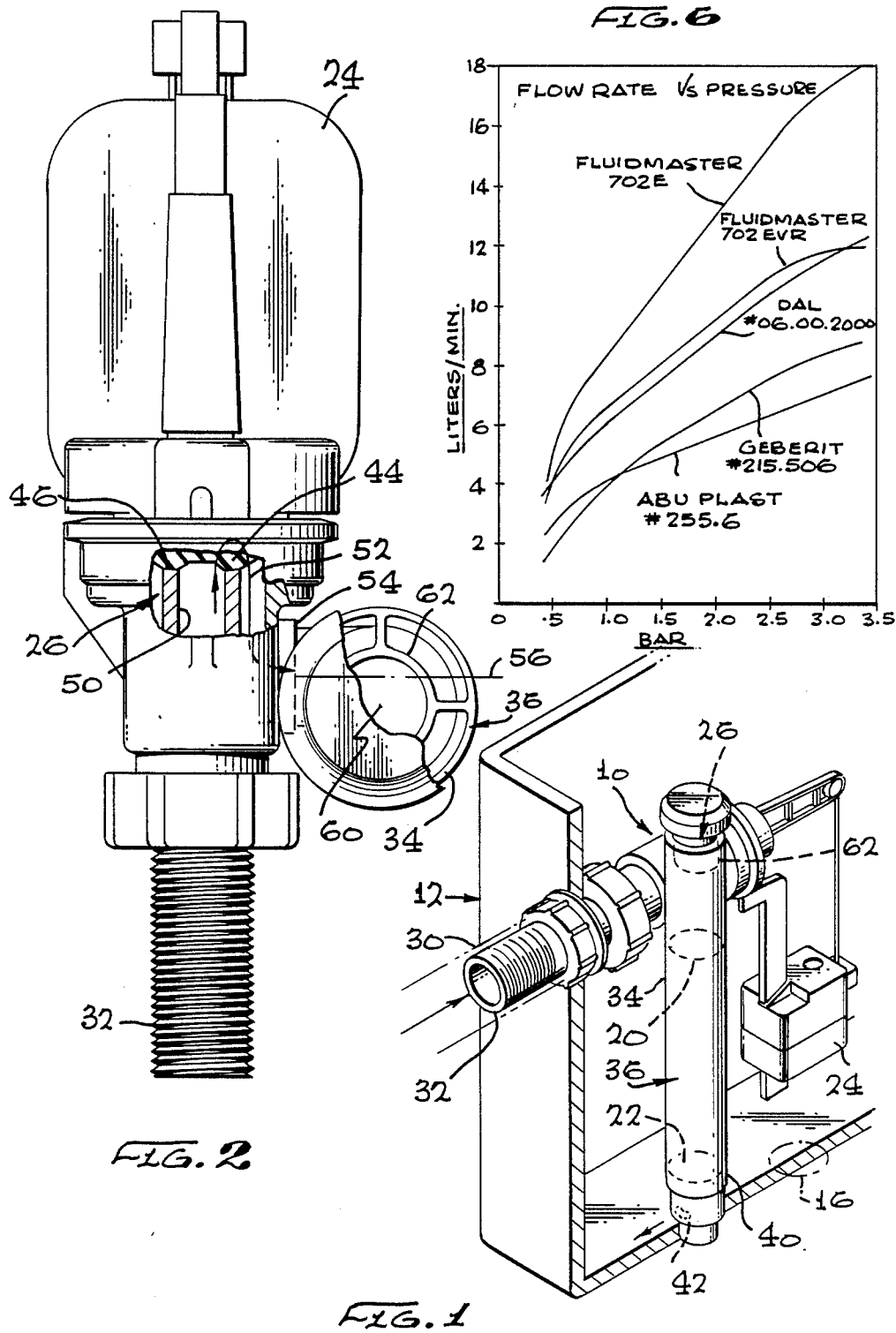

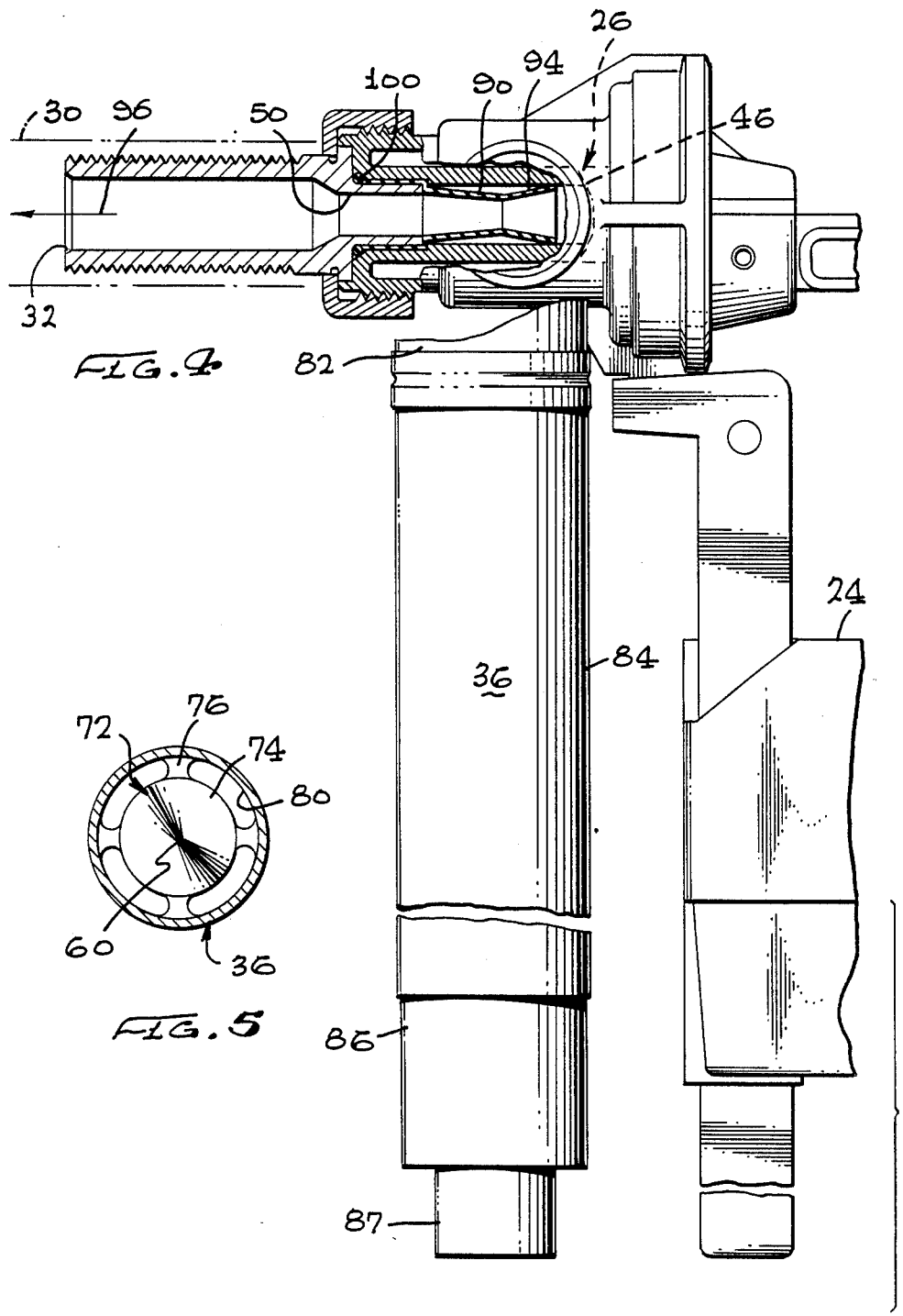

LOW NOISE TOILET TANK VALVE

BACKGROUND OF THE INVENTION

Toilet refill valves typically have a valve device operated by a float, the valve device opening when the toilet is flushed, to refill the water closet. Water passing through the open valve device passes into a vertical outlet tube that carries the water to the bottom of the water closet to minimize noise. The outlet tube has an anti-siphon opening above the high water line to prevent water in the water closet from flowing backward through the valve device to the home water supply, in the event that there is a vacuum in the home water supply. It is generally desirable that no check valve or the like lie along the anti-siphon air opening, to assure reliable anti-siphon operation even with a small vacuum in the home water supply.

The presence of the air opening gives rise to considerable noise during a period of perhaps one half minute during which when the water closet is refilled after each flushing. As water passes down the outlet tube, air is drawn in through the anti-siphon opening, which mixes with the water. This flowing air creates substantial noise, with some of it generated as the air flows in through the air opening, and with perhaps even more generated as the bubbles in the water flowing down the air tube are released at the bottom of the water closet to rise to the top and "pop." A refill valve, of the type which has an outlet tube that carries water to near the bottom of a water closet and which also has an anti-siphon opening, which created minimal noise during refill of the water closet, would be of considerable value.

Another source of noise in a refill valve, is a "hammer" noise which occurs when the valve device closes, when the water closet has been refilled. Where the valve device is of a type that closes suddenly, it can produce a shock that passes upstream into the pipes leading to the refill valve. A device that minimized noise from sudden closing of the valve device, would also be of considerable value.

SUMMARY OF THE INVENTION

In accordance with one embodiment of the present invention, a refill valve is provided which creates minimal noise. The valve includes a valve device that allows water to flow through a conduit into the upper portion of a largely vertical outlet tube that carries the water to the bottom of the water closet. An air tube is located at the upper portion of the outlet tube, above the high water line in the water closet. The air tube has a lower end facing largely downwardly along the downward flow of water in the outlet tube, and an upper end open to the atmosphere. A restriction is located along the outlet tube below the bottom of the air tube. For supply water of at least a certain minimum pressure such as 20 psi, the restriction is sufficient that water backs up in the outlet tube to at least the bottom of the air tube. The water at the bottom of the air tube is substantially stagnant, so that it does not pull in air from the outside to flow down the outlet tube. Thus, there is no inward air flow to cause the noise at the air tube or to produce bubbles at the bottom of the outlet tube.

The refill valve includes a conduit coupling a water inlet to the valve device. The conduit includes a tube of elastomeric material with a tapered portion which is of progressively smaller diameter at locations progressively further upstream from the valve device. The elastomeric tapered portion absorbs a shock wave occurring when the valve device suddenly closes, to minimize "hammer" noise in the pipes leading to the refill valve.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a refill valve constructed in accordance with the present invention, shown mounted on a water closet.

FIG. 2 is a plan and sectional view of the valve of FIG. 1.

FIG. 4 is a front and sectional view of the valve of FIG. 1.

FIG. 5 is a view taken on the line 5—5 of FIG. 3.

FIG. 6 is a chart showing variation of flow rate of water into a water closet with water supply pressure for refill valves of the present invention and of the prior art.

DESCRIPTION OF THE PREFERRED EMBODIMENT

Figure 3:
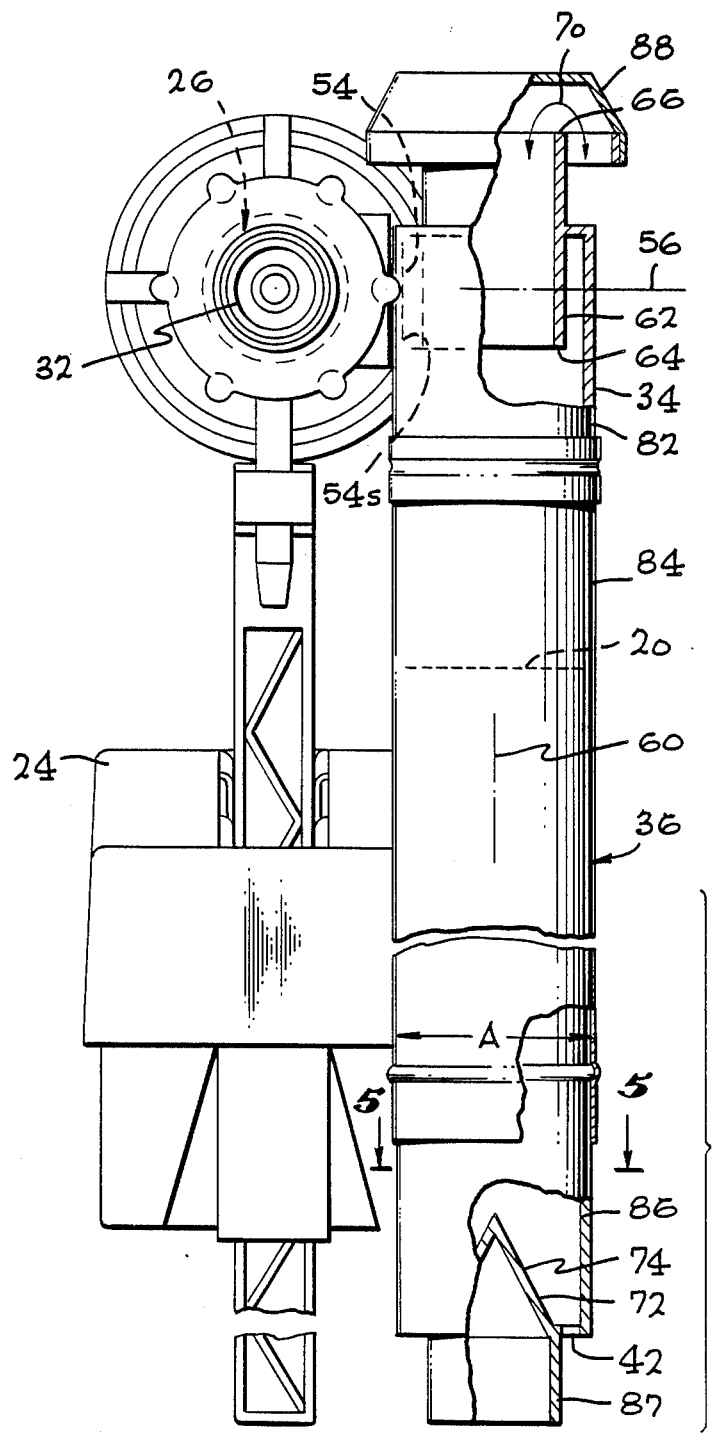
FIG. 3 is a left side and sectional view of the valve of FIG. 1.

FIG. 1 illustrates a toilet refill valve 10 disposed in a water closet 12. The water closet has a flush valve indicated at 16 which can be opened to flush a toilet bowl (not shown), which results in water dropping from a high water line 20 to a low water line 22. When the water level falls, a float 24 drops and opens a valve device 26. This allows water from a water supply 30 to pass through a water inlet 32, past the open valve device 26, into the upper part 34 of an outlet tube 36. The water flows down along the outlet tube to the lower part 40 thereof, where it exits through an opening 42 to refill the water closet.

As shown in FIG. 2, the valve device 26 includes a valve closing member 44 that can move against and away from a valve seat 46. When the valve closing member is away from the valve seat, water can flow through a conduit 50 along the path indicated by arrow 52 to a downstream conduit end 54. The conduit end opens to the outlet tube 36, with the axis 56 of the conduit end offset from the axis 60 of the outlet tube to obtain a swirling action.

The valve includes an anti-siphon air tube 62, with a portion lying in the upper part 34 of the outlet tube. As shown in FIG. 3, the air tube has lower and upper ends 64, 66. The lower end 64 faces, or opens in a downward direction. The lower end 64 of the air tube preferably lies below the axis 56 of the downstream conduit end 54, and preferably no higher than the lower side 54s of the conduit end. Thus, water issuing from the conduit end moves around and downwardly along the outside of the air tube, and down along the outlet tube 36 to flow into the bottom of the water closet.

If the downward flow of water through the outlet tube were unrestricted, then such flow would create a vacuum at the lower end 64 of the air tube. As a result, air would flow along the paths indicated at 70 down through the air tube. Such air flow would create noise during a period of perhaps one half minute when the water closet is being refilled. Some of the noise would be created by the flow of air past edges and other surfaces near the top of the air tube. Also, the air drawn in would mix with the water flowing down the outlet tube, and create bubbles rising from the opening 42 at the bottom of the outlet tube and "popping" at the surface. Many people find noise generated by operation of toilets to be objectionable, and it is desirable to minimize the noise as much as possible.

A restriction 72 lies along the outlet tube below the bottom 64 of the air tube, to restrict the outflow of water from the bottom of the outlet tube. The restriction results in water filling the outlet tube up to the bottom 64 of the air tube, or even higher. If water lies substantially stagnant at the bottom of the air tube, no air is drawn along the paths 70 into the air tube. As a results, no noise is created by the rush of air into the air tube, or by the release of air bubbles at the bottom of the outlet tube. The result is that the amount of noise created during refill of the water closet is greatly reduced.

The air tube 62 is provided to prevent siphoning of water from the water closet, through the valve device 26, and through the water inlet 32 (FIG. 4) into the water supply 30, in the event that there is a vacuum at the water supply 30. Laws require such anti-siphon provisions. The air tube prevents such siphoning because its lower end is above the upper water line 20, so that if water starts to be siphoned back, air can flow along the paths 70 to break the siphon.

The restriction 72 is formed by a cone-shaped portion 74 connected by radially-extending walls 76 (FIG. 5) to leave slots 80 through which water can pass to the water closet. The cone-shaped portion of the restrictor minimizes noise created at the restriction. The cross sectional area of the slots 80 control the degree of restriction of flow, and is preferably less than half the cross-sectional area of the outlet tube. The outlet tube is formed in three sections 82, 84 and 86. The upper and lower sections 82, 86 are molded parts. The lower section 86 is telescoped in the middle section 84, and can be adjusted so the bottom of a spacer portion 87 lies at or close to the bottom of water closets of different heights.

Applicant chooses a degree of restriction (amount of opening of the slots 80) so that water will fill the outer tube up to the bottom 64 of the air tube, when the supply pressure at the water inlet 32 is about 20 psi (i.e., 15 psi to 25 psi). Most municipal water supplies in developed countries deliver water at a pressure of at least about 20 psi. For somewhat higher pressures, the level of water during refill of the water closet lies higher in the air tube 62, until it lies at the top 66 of the air tube for a supply pressure of 32 psi. At even higher water pressures, some of the water flows over the top 64 of the air tube, or sprays upwardly from the top of the air tube. A cover 88 lies over the top of the air tube, to deflect any upwardly-spraying water into a generally downward direction. Most water moving up through the top of the air tube is directed to flow down along the outside of the outlet tube 36, which guides it to the water in the water closet, to achieve flow with minimal noise.

Before the toilet is flushed, water in the outlet tube is at the level 20 equal to that in the water closet. When the toilet is flushed, and the level of water in the outlet tube drops somewhat, water is immediately delivered to the top of the outlet tube, and the water level in the outlet tube rises during a period of perhaps one second until it reaches the bottom of the air tube. While considerable noise may be created during that period of perhaps one second, the noise is masked by the noise of the flushing toilet.

The valve device is preferably of a type which closes rapidly when the level of water in the water closet reaches the predetermined high water line, such as the valve device described in U.S. Pat. No. 4,338,964. Such rapid closing prevents a long period of valve closing, which would occur if the valve device were closed gradually which would result in the water in the water closet then rising slowly during gradual closing. The preferred rapid closing of the valve device can result in a "hammering" effect due to suddenly stopping the water moving towards the valve device. As shown in FIG. 4, applicant places a shock-absorbing tube 90 along the conduit 50 that couples the water inlet 32 to the valve seat 46 of the valve device 26. The tube 90 is formed of elastomeric material such as rubber, of a shore hardness of about 65. The tube has a tapered portion 94 which is of progressively smaller diameter at locations progressively farther or upstream from the valve device 26. Also, the tapered portion 94 is preferably not restricted in slight expansion. When the valve device 26 suddenly closes and creates a shock wave traveling in an upstream direction 96, the shock energy tends to expand the tapered portion 94 of the tube. The elastomeric tapered portion 94 absorbs some of the energy of the shock by expanding, to thereby reduce the noise traveling upstream along the water pipes, away from the refill valve. The shock-absorbing tube 90 has a flange 100 at its upstream end, which is captured between different parts of the refill valve, which leaves the downstream tapered portion 94 free to deflect upstream slightly.

Applicant has constructed and tested a refill valve of the type illustrated and described above, with an outlet tube internal diameter A of one inch and a maximum length B from the axis 56 of the conduit end of 9 inches, and with the relative sizes of the other parts as shown. These tests showed that applicant's refill valve created significantly less noise than the best prior art refill valves, and that they resulted in a faster flow rate of water through the refill valve into the water closet than the best prior art refill valves.

FIG. 6 contains five graphs showing variation of flow rate of water into the water closet after a flushing, with water pressure (one BAR =0.987 atmospheres =14.5 psi) at the valve inlet, for five different refill valves. Three of these refill valves, ABU Plast #255.6, Geberit #215.506, and DAL #06.00.2000 are among the best selling valves in Western Europe. The valve identified as Fluidmaster 702E is a valve of the present invention constructed as described and illustrated above. It can be seen that the flow rate is higher than for the other valves, which results in a shorter refill time (during which refill noise is generated). The valve identified as Fluidmaster 702EVR is the same valve as the 702E, but with a restriction upstream from the valve device (26) to limit the flow rate (for any water pressure) to about 12 liters per minute. Such restriction is included to comply with building code restrictions in some countries. The amount of noise generated by each refill valve is evaluated by a subjective test of persons listening to refill valves in operation and judging which seems quietest. The refill valve described and illustrated above was judged to be the quietest, as compared to the other three valves listed in the chart of FIG. 6.

Thus, the invention provides a water closet refill valve with an anti-siphon opening, which creates minimal noise during the refill of the water closet. The valve includes a conduit leading from a valve device to a downstream conduit end that opens to the upper portion of a substantially vertical outlet tube. An air tube has a downwardly-facing lower end that lies in the upper portion of the outlet tube. A restriction below the air tube, causes the level of water in the outlet tube to rise to at least the bottom of the air tube when the water pressure is at at least a certain minimum pressure. The blockage of the air tube avoids noise that would be caused by air flowing through the air tube into the outlet tube. A shock-absorbing tube of elastomeric material lies upstream of the valve device, and has tapered portion that helps absorb shock caused when the valve device suddenly closes.

Although particular embodiments of the invention have been described and illustrated herein, it is recognized that modifications and variations may readily occur to those skilled in the art and consequently it is intended to cover such modifications and equivalents.

What is claimed is:

1. In a toilet refill valve for refilling a water closet after each toilet flushing, which includes a water inlet for receiving water at at least a predetermined minimum water inlet pressure, a vertical outlet tube for carrying refill water to said water closet, a conduit connecting said inlet to said outlet tube, and a valve device lying along said conduit and having a valve closing member responsive to the level of water in the water closet for passing water to flow to the downstream end of the conduit and into the upper end portion of said outlet tube to flow down therealong to near the bottom of the water closet and into the water closet, the improvement comprising:

an anti-siphon air tube at the upper portion of said outlet tube, said air tube having an upper end open to the atmosphere at the top of the water closet, and said air tube having a lower end facing downwardly along the flow of water down along said outlet tube, so water moving down along said outlet tube tends to draw air down through the air tube into the water flow;

said outlet tube having a restriction located below the bottom of said air tube, said restriction providing sufficient restriction to the outflow of water, so that the water fills said outlet tube up to at least the bottom of said air tube at said predetermined minimum water inlet pressure, and with said conduit downstream end being positioned to flow substantially all water that will pass down through said outlet tube so that it first flows directly into said outlet tube, while preventing the downward flow of water through said air tube while said valve device is open, whereby to prevent the inflow of air through said air tube into said outlet tube during most of each refilling of the water closet to minimize noise.

2. The improvement described in claim 1 wherein:
said air tube is of a substantially constant diameter which is more than half the diameter of said outlet tube upper portion; and including
a cover lying over and spaced above the top of said air tube, to leave a wide space between them through which air can enter the top of said air tube, said cover being constructed to divert water spraying up out of said air tube to flow down around the outside of said outlet tube.

3. The improvement described in claim 1 wherein:
said outlet tube comprises an upper tube part and comprises a lower tube part that includes said restriction therein, the top portion of said lower tube part and the bottom portion of said upper tube part being telescoped one in the other with the depth of telescoping being adjustable, whereby to locate the bottom of said lower tube part at the bottom of water closets with different heights of the water inlet above the water closet bottom.

4. The improvement described in claim 1 wherein:
said outlet tube has a substantially vertical axis, said restriction comprises a cone-shaped portion with its narrowest end uppermost and which is fixed to the rest of said outlet tube.

5. The improvement described in claim 1 wherein:
said valve device has a valve seat and includes a conduit portion extending from said valve seat to the upper end portion of said outlet tube;
said air tube has a smaller outside diameter than the internal diameter of the upper portion of said outlet tube to leave a gap between them along the entire height of the portion of said air tube which lies within said outlet tube;
the downstream end of said conduit lies at a level between the top and bottom of said air tube, and said air tube is open to said outlet tube only at the bottom of said air tube to avoid the flow of water from said conduit directly into said air tube.

6. The improvement described in claim 1 including:
a conduit coupling said water inlet to said valve device, said conduit including a shock-absorber tube of elastomeric material with a tapered portion which is of progressively smaller diameter at locations progressively farther from said valve device, whereby to minimize the passage of a shock wave when said valve suddenly closes.

7. The improvement described in claim 1 wherein:
said restriction is sufficient that water fills said outlet tube to at least the bottom of said air tube for a water pressure of about 20 psi.

8. A toilet refill valve for lying in a water closet comprising:
a water inlet that receives water;
a substantially vertical outlet tube with upper and lower portions, said lower portion having an outlet;
walls forming a conduit extending from said water inlet to said outlet tube, said conduit having a downstream conduit and opening to said outlet tube;
a valve device lying along said conduit;
an anti-siphon air tube with a lower end lying within said outlet tube below the center line of said downstream conduit end and facing downwardly, said air tube having an upper portion open to the atmosphere, said air tube being constructed so water from said conduit end flows directly into said outlet tube and down through said outlet tube into the while preventing water from flowing down through said air tube when said valve device is open;
a restrictor located in said outlet tube between said lower end of said air tube and said outlet;
said restrictor allowing water entering said water inlet at a pressure of at least about 20 psi and passing through said conduit to said outlet tube, to fill said outlet tube up to at least the bottom of said air tube, whereby to prevent the inflow of air through said air tube into said outlet tube during most of each refilling of the water closet to minimize noise.

9. The valve described in claim 8 wherein:
said restrictor is mounted to said outlet tube and is cone-shaped with its narrowest end uppermost and it base lowermost, and said outlet tube includes a plurality of openings spaced about the base of said cone-shaped restrictor.

10. The valve described in claim 8 wherein:
the portion of said conduit that lies upstream from said valve device includes a shock-absorber tube of elastomeric material with an internal tapered portion that has its narrowest end furthest from said valve device.

11. A method for operating a water closet refill valve which includes a conduit that has an inlet and that carries water from the inlet past a valve device to the upper portion of an outlet tube to flow down along the outlet tube to near the bottom of the water closet and into the water closet, wherein the refill valve includes an anti-siphon air tube having a bottom lying within the outlet tube and a top open to the atmosphere, comprising:
flowing water applied at a pressure of at least about 20 psi into said inlet and through said conduit into said outlet tube and around the bottom of said air tube, and down through said outlet tube into said water closet, while preventing water from flowing from said conduit into said air tube without first flowing into said outlet tube, including restricting the downward flow of water along said outlet tube sufficiently that the water level in said outlet tube rises to at least the bottom of said air tube, whereby to avoid drawing in air to mix with the refill water during most of a refill cycle to minimize noise.

* * * * *